United States Patent [19]

Coghran et al.

[11] Patent Number: 4,870,332

[45] Date of Patent: Sep. 26, 1989

[54] VOLTAGE-BOOSTING MOTOR CONTROLLER

[75] Inventors: David S. Coghran, Los Altos; Gean-Chung Hsu, Fremont, both of Calif.

[73] Assignee: Xebec, Santa Clara, Calif.

[21] Appl. No.: 222,007

[22] Filed: Jul. 8, 1988

[51] Int. Cl.[4] .............................................. H02K 29/08
[52] U.S. Cl. ..................................... 318/254; 318/138
[58] Field of Search ................ 318/138, 254, 293, 439

[56] References Cited

U.S. PATENT DOCUMENTS

| | | | |
|---|---|---|---|
| 3,622,851 | 11/1971 | Hanada | 318/138 |
| 4,135,120 | 1/1979 | Hoshimi et al. | 318/138 |
| 4,338,551 | 7/1982 | Mizumoto | 318/254 |
| 4,507,590 | 3/1985 | Miyazaki | 318/254 |
| 4,546,294 | 10/1985 | Ban et al. | 318/138 X |
| 4,622,499 | 11/1986 | Squires et al. | 318/254 |
| 4,639,798 | 1/1987 | Harrison et al. | 360/73 |
| 4,700,116 | 10/1987 | Inoue et al. | 318/254 |

OTHER PUBLICATIONS

"Brushless DC Motors Get a Controller IC That Replaces Complex Circuits", Electronic Design, Sep. 19, 1985, pp.1–6.
"Linear Integrated Circuits", UC 3620, Unitrode Corporation, Lexington, MA 02173.
"Linear Integrated Circuits", UC 1633, UC 2633, UC 3633, Unitrode Corporation, Lexington, MA 02173.
Unitrode Integrated Circuits, Application Note, U-113, Unitrode Corporation Lexington, MA 02173.
"UC 1633 Phase Locked Controller", Unitrode Corporation, Lexington, MA 02173.
Brushless DC Motor, Specification DLD-5XE, STC Shinano Tokki Co.

Primary Examiner—Bentsu Ro
Attorney, Agent, or Firm—Thomas E. Schatzel

[57] ABSTRACT

A boosted power-supply voltage is developed by the combination of three power drivers, a filter capacitor, and a Y-connected motor. Each of the power drivers includes a pair of transistors connected in a totem-pole configuration with a clamping (catch) diode connected between the collector and the emitter of the upper transistor. Rather than a power-supply voltage source, only the filter capacitor is connected to the collectors of the upper transistors, a reduced-voltage level DC power-supply voltage-source being connected to the motor-winding-common node.

12 Claims, 2 Drawing Sheets

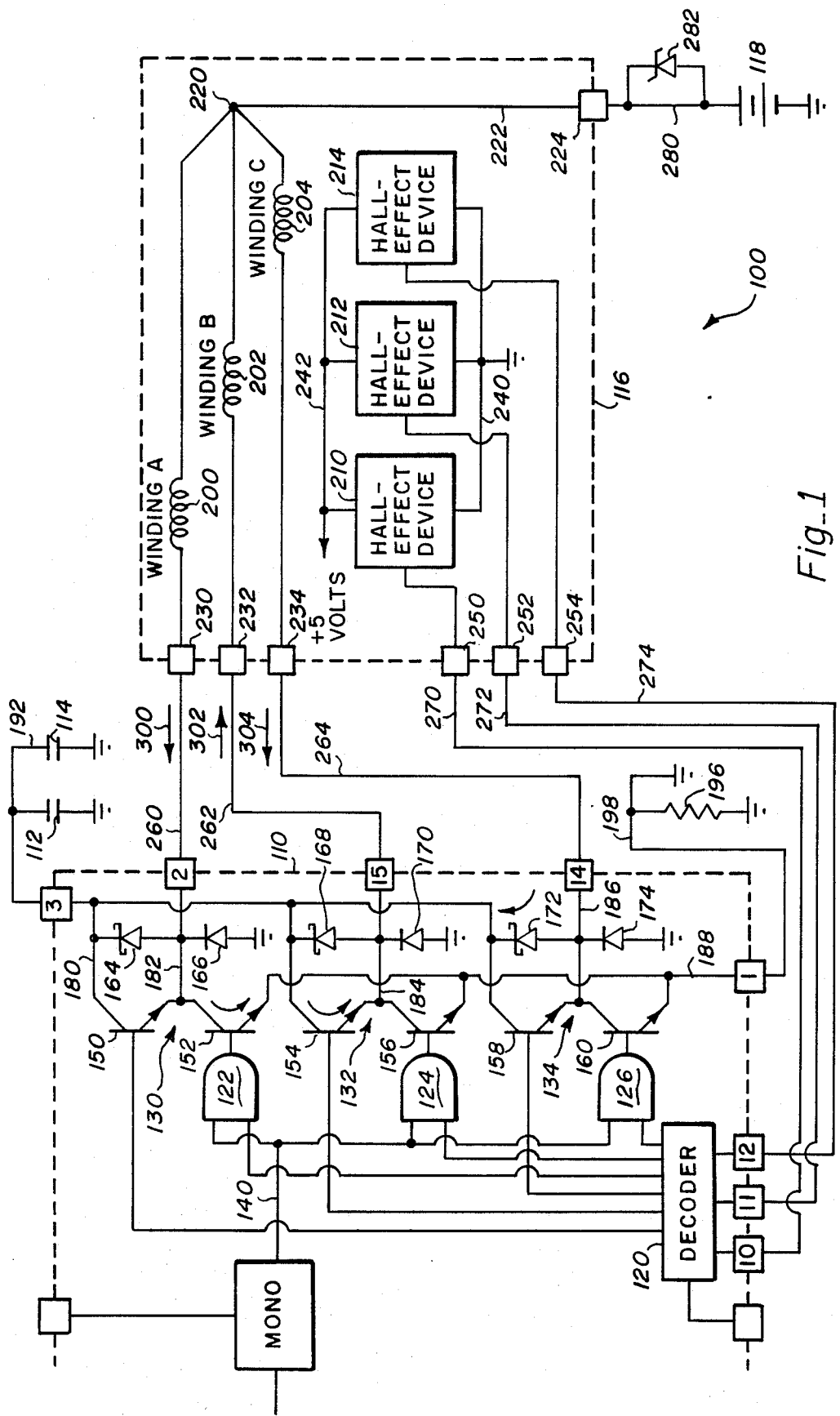

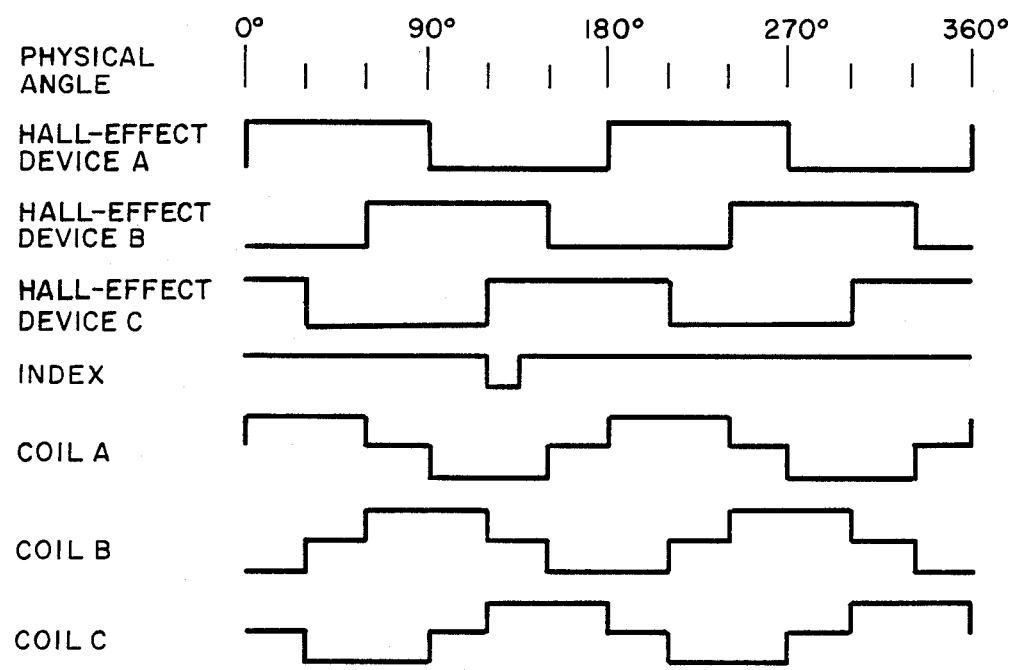
Fig_2

4,870,332

VOLTAGE-BOOSTING MOTOR CONTROLLER

TECHNICAL FIELD

The present invention relates to electric motors generally and more specifically to a motor controller which, with an associated motor, boosts the power-supply voltage.

BACKGROUND ART

Heretofore, the relatively high back electromotive force (EMF) generated by certain electrical motors at operating speed has dictated a higher than available electrical power-supply voltage. Consider, for example, the electrical motor which is designated STC DC Brushless Spindle Motor DLD-5XE (part number 4110001880) by the Shinano Tokki General Corporation. The motor is of the three-phase four-pole half-wave-drive outer-rotor type, suitable for use in 5.25 inch disk memory systems (drives). Included with the motor are Hall-effect devices (sensors) which generate commutation signals. The three motor windings (coils) are configured in a (star) Y-configuration in which one end of each of the windings is connected to a motor-winding-common connector pin (node); and, the other (free) end of each of the windings is connected to a corresponding winding connector pin.

A circuit diagram of a recommended controller for use with the motor is included in the motor specifications by the manufacture. The recommended controller is of the type which is referred to herein as "unipolar". More specifically, the motor Hall-effect devices are shown connected to drive a decoder, which drives three power drivers, each of which drive a corresponding one of the motor windings. The decoder is shown to include three 74LS09-type two-input AND gates and three 74LS04-type inverters. One of the two inputs of each of the gates is connected to the output of a corresponding one of the Hall-effect devices. The other one of the two inputs of each of the gates is connected to the output of a corresponding one of tha inverters, the input of which is connected to the output of a succeeding one of the Hall-effect devices. The output of each of the gates is connected to the input of the corresponding one of the power drivers. The power drivers are each shown to include a pair of transistors, which are connected in a Darlington configuration. More specifically, a first one of each Darlington pair of transistors is configured with the transistor base connected to the output of the corresponding one of the three gates of the decoder and the transistor emitter connected to the base of tha other (second) one of the Darlington pair of transistors. The second one of the Darlington pair of transistors is configured with the transistor collector connected to the winding connector pin which is connected to the free end of the corresponding one of the three motor windings and the transistor emitter connected to a power-driver-common node which is coupled to circuit ground by a feedback resistor. Finally, the motor-winding-common connector pin is connected to a DC power-supply voltage source which provides power for the motor. The manufacture recommends that the DC voltage source have a voltage which is between 10.8 and 13.2 volts.

In another, "unipolar", controller, the winding connector pin which is connected to the free end of each of the motor windings is additionally connected to the anode of a corresponding one of three catch diodes. The cathode of each of the diodes is connected to another node, which is connected to the cathode of a 24-volt zener diode, the anode of which is connected to circuit ground.

Although effective, motors driven by the above-mentioned "unipolar" controllers lack the torque and spin-up acceleration of motors driven by controllers of the type which are referred to herein as "bipolar". Such a controller is included in the integrated-circuit device of the type which is designated UC3620 by the Unitrode Corporation and which is described in their Application Note U-113 and their Specifications UC1633 and UC3620. In addition to a decoder (and associated gates), the controller device employs three power drivers. Each of the power drivers includes a pair of transistors connected in a totem-pole configuration with a pair of clamping (catch) diodes. More particularly, the upper one of each totem-pole pair of transistors is configured with the transistor collector connected to a device pin (number 3) for connection to a DC power-supply voltage source to provide power for the motor and the transistor emitter connected to a respective one of three device pins (numbered 2, 15, and 14) for connection to the winding connector pin connected to the free end of the corresponding one of the three motor windings. The other (lower) one of the totem-pole pair of transistors is configured with the transistor collector connected to the emitter of tha upper transistor and the lower transistor emitter connected to a device pin (number 1) to be coupled to circuit ground by a current-sensing feedback resistor. One of the diodes, a Schottky diode, is configured with the diode cathode connected to the collector of the upper transistor and the diode anode connected to the emitter of the upper transistor. The other one of the diodes is configured with the diode cathode connected to the collector of the lower transistor and the diode anode connected to circuit ground. It is important to nota that the DC power-supply voltage source is connected to (pin number 3 and, thus,) the collectors of the upper transistors of the totem-pole pair of transistors; and, tha motor winding common connector pin is not connected (left floating). Unfortunately, to power the above mentioned motor, the DC power-supply voltage source (connected to pin number 3) should have a voltage which is between approximately 16 and 26 volts.

DISCLOSURE OF THE INVENTION

The primary object of the present invention is to provide a motor controller which, with an associated motor, boosts the voltage level of the power-supply voltage source.

Another object of the present invention is to provide a motor controller which is relatively simple and inexpensive.

Briefly, tha presently preferred embodiment of a voltage-boosting motor controller in accordance with the present invention employs the above-mentioned Unitrode Corporation UC3620-type controller device connected to a pair of filter capacitors and to the above-mentioned Shinano Tokki General Corporation DLD-5XE-type STC DC Brushless Spindle Motor. Rather than a power-supply voltage source, only the filter capacitors are connected to the power-supply voltage-source pin (number 3), a reduced-voltage-level DC power-supply voltage source being connected to the motor-winding-common connector pin.

These and other objects of the present invention will no doubt become apparent to those skilled in the art after having read the detailed description of the presently preferred embodiment of the present invention which is illustrated in the figures of the drawing.

BRIEF DESCRIPTION OF THE FIGURE IN THE DRAWING

FIG. 1 is a schematic diagram of a voltage-boosting motor controller in accordance with the present invention.

FIG. 2 is a timing diagram illustrating the various operative states of the voltage-boosting motor controller illustrated in FIG. 1.

BEST MODE FOR CARRYING OUT THE INVENTION

The presently preferred embodiment of a voltage-boosting motor controller in accordance with the present invention is illustrated in FIG. 1 of the drawing generally designated by the number 100. Controller 100 employs the above-mentioned Unitrode Corporation UC3620-type controller device, which, in the figure, is designated 110; a filter capacitor 112; an RF-bypassing capacitor 114; the above-mentioned Shinano Tokki General Corporation DLD-5XE-type STC DC Brushless Spindle Motor, which, in the figure, is designated 116; and a 12-volt DC power-supply voltage source 118. Controller device 110 is shown to include a (commutating means) decoder 120; three, associated, two-input AND gates, respectively designated 122, 124, and 126; and three power drivers, respectively designated 130, 132, and 134. Decoder 120 is shown to have three inputs which are shown each connected to a respective one of three device pins which are respectively numbered 10, 11, and 12) to receive timing signals generated by Hall-effect devices of an associated motor. In addition, decoder 120 is shown to have six outputs, of which, three are shown connected, each to a respective on a of the power drivers (130, 132, and 134) and the other three are shown connected, each to one of the inputs of a respective one of the AND gates (122, 124, and 126). The other (second) input of each of the AND gates (122, 124, and 126) is shown connected to a line 140.

Each of the power drivers is shown to include a pair of NPN transistors (switches) connected in a totem-pole configuration with a pair of clamping (catch) diodes. The transistors of power driver 130 are respectively designated 150 and 152; the transistors of power driver 132 are respectively designated 154 and 156; and, the transistors of power driver 134 are respectively designated 158 and 160. The diodes of power driver 130 are respectively designated 164 and 166; the diodes of power driver 132 are respectively designated 168 and 170; and, the diodes of power driver 134 are respectively designated 172 and 174. The upper one of each totem-pole pair of transistors (transistor 150 for power driver 130, transistor 154 for power driver 132, and transistor 158 for power driver 134) is shown configured with the transistor base (control means) connected to an output of decoder 120; the transistor collector (contact means) connected by a line 180 to a device pin (number 3), which is (normally) for connection to a DC power-supply voltage source to provide power for the motor; and the transistor emitter (contact means) connected by a respective one of three line 182, 184, and 186 to a respective one of three device pins (numbered 2, 15, and 14) for connection to the winding connector pin connected to the free end of the corresponding one of the three motor windings, of an associated motor. The other lower) one of the totem-pole pair of transistors (transistor 152 for power driver 130, transistor 156 for power driver 132, and transistor 160 for power driver 134) is shown configured with the transistor base (control means) connected to the output of a respective one of the three AND gates (122, 124, and 126); the transistor collector (contact means) connected to the emitter of the upper transistor; and the lower transistor emitter (contact means) connected by a line 188 to a device pin (number 1) to be coupled to circuit ground by a current-sensing feedback resistor. One of the diodes, a Schottky diode, (diode 164 for power driver 130, diode 168 for power driver 132, and diode 172 for power driver 134) is shown configured with the diode cathode connected to the collector of the upper transistor and the diode anode connected to the emitter of the upper transistor. The other one of the diodes (diode 166 for power driver 130, diode 170 for power driver 132, and diode 174 for power driver 134) is shown configured with the diode cathode connected to the collector of the lower transistor and the diode anode connected to circuit ground.

Filter capacitors 112 and 114 are each connected between circuit ground and a line 192, that is connected to the device pin (number 3), which is (normally) for connection to a DC power-supply voltage source. Although this pin (number 3) would normally be connected to a DC power-supply voltage source, it is important to note that, in the present invention, a DC power-supply voltage source is not connected to this pin. Rather, in the present invention, controller device 110, with motor 116, develops at this pin (number 3) a voltage level which ia double the voltage level of a power-supply voltage source, less certain translator and diode voltage drops, as will become apparent shortly. In the presently preferred embodiment, capacitor 112, which is of the tantalum type, has a capacitance of 1.5 microfarad; and, capacitor 114, which is of the ceramic disk type, has a capacitance of 0.01 microfarad.

In the presently preferred embodiment, the controller-device 110 feedback pin (number 1) is coupled to circuit ground by a current-sensing feedback resistor, represented by a resistor 196. In another embodiment, the pin (number 1) is directly connected to circuit ground, as represented by a line 198. When employed, resistor 196 develops a feedback signal for driving controller device 110. Responsive thereto, controller device 110 drives AND gates 122, 124, and 126 with a chopped signal to regulate the level of the current flowing through transistors 152, 156, and 160.

Motor 116 includes three windings, respectively designated 200 (winding A), 202 (winding B), and 204 (winding C), and three Hall-effect devices, respectively designated 210 (device A), 212 (device B), and 214 (device C). The three motor windings (200, 202, and 204) are configured in a (star) Y-configuration in which one end of each of the windings is connected to a motor-winding-common node 220, that is connected by a line 222 to a connector pin 224. The other (free) end of each of the windings is connected to a corresponding one of three winding connector pins, which are respectively designated 230, 232, and 234.

To provide power for the Hall-effect devices, each of the devices is connected to a line 240, which is connected to circuit ground and to a line 242, which is connected to a 5-volt DC power-supply voltage source. The outputs of the Hall-effect devices are connected, each to a respective one of three connector pins, respectively designated 250, 252, and 254. The Hall-effect devices generate commutation signals for driving the decoder of controller device 110.

Motor 116 is connected to controller device 110. More specifically, the motor connector pins connected to the free end of each of the three motor 116 windings (200, 202, and 204) are connected, by a respective one of three lines, designated 260, 262, and 264, to a respective one of tha controller-device 110 driver pins (2, 15, and 14). Also, the motor connector pins connected to the output of each of the three motor 116 Hall-effect devices (210, 212, and 214) are connected, by a respective one of three lines, designated 270, 272, and 274, to a respective one of the controller-device 110 decoder pins (10, 11, and 12).

In the presently preferred embodiment, the motor 116 motor-winding-common connector pin 224 is directly connected to DC power-supply voltage source 118, as represented by a line 280. In another embodiment, the connector pin (224) is coupled to DC power-supply voltage source 118 by a steering diode, represented by a diode 282. (When employed, diode 282 limits the level of the current flowing through the conductive one of transistors 150, 154, and 158 to the level of the current flowing through the conductive one of transistors 152, 156, and 160.)

Operationally, when voltage-boosting motor controller 100 is in tha state in which transistors 152 and 154 are "turned on" and the other transistors are "turned off", a current flows from DC power-supply voltage source 118 through motor 116 winding (A) 200 and transistor 152 to circuit ground, as indicated by an arrow 300. As indicated by an arrow 302, simultaneously, a current flows from filter capacitor 112 through transistor 154 and motor 116 winding (B) 202 into node 220. Also, simultaneously, a current flows from node 220 through motor 116 winding (C) 204 and diode 172 into filter capacitor 112, as indicated by an arrow 304. This latter "flyback" current (represented by arrow 304) is generated from the energy (which was stored in the winding (204) when transistor 160 was, previously, on) when the energy is released as tha magnetic field around the winding collapses. This, and similar "flyback" currents charge filter capacitor 112, (auto)generating, across filter capacitor 112, a voltage, the level of which is double the voltage level of the power-supply voltage source, less the associated transistor and diode voltage drops. (Simultaneously, such a "flyback" current is generated by winding (A) 200 as (when) the drive to AND gate 122 is chopped.)

A timing diagram illustrating the various operative states of the voltage-boosting motor controller is illustrated in FIG. 2.

In another embodiment, (the signals generated by the) Hall-effect devices are not used. Rather, drivers, similar to drivers 130, 132, 134, are driven by commutation signals generated by a counter-driven pre-programmed memory device. Unfortunately, being "free-running", the motor, in this embodiment, tends to "lock-up" when the commutation signals get out of synchronization with the position of the motor rotor.

Of course, PNP or FET type transistors may be used for transistors 150, 152, 154, 156, 158, and 160. Although in the presently preferred embodiment a three-phase motor is employed, other, multi-phase (two or more) motors may be used.

It is contemplated that after having read the preceding disclosure, other alterations and modifications of the present invention will no doubt become apparent to those skilled in the art. It is therefore intended that the following claims be interpreted to cover all such alterations and modifications as fall within the true spirit and scope of the invention.

What is claimed is:

1. A motor controller comprising in combination:
    a motor including,
        a first winding having a first end and a second end and
        a second winding having a first end connected to said first-winding-first end and a second end;
    a DC voltage source having a first end coupled to said first-winding-first end and a second end, said DC voltage source for powering said motor;
    a capacitor having a first end connected to said DC voltage-source-second end and a second end;
    commutating-signal-generating means;
    a first-power driver including,
        a first-switching means having a control means connected to said commutating-signal-generating means, a first-contact means connected to said capacitor-second end, and a second-contact means connected to said first-winding-second end,
        a first diode connected between said first-power-driver-first-switching-means-first-contact means and said first-power-driver-first-switching-means-second-contact means, and
        a second-switching means having a control means connected to said commutating-signal-generating means, a first-contact means connected to said first-power-driver-first-switching-means-second-contact means, and a second-contact means;
    a second-power driver including,
        a first-switching means having a control means connected to said commutating-signal-generating means, a first-contact means connected to said capacitor-second end, and a second-contact means connected to said second-winding-second end,
        a first diode connected between said second-power-driver-first-switching-means-first-contact means and said second-power-driver-first-switching-means-second-contact means, and
        a second-switching means having a control means connected to said commutating-signal-generating means, a first-contact means connected to said second-power-driver-first-switching-means-second-contact means, and a second-contact means connected to said first-power-driver-second-switching-means-second-contact means; and
    means coupling said first-power-driver-second-switching-means-second-contact means to said DC voltage-source-second end.

2. A motor controller as recited in claim 1 wherein said first-power driver further includes a second diode connected between said first-power-driver-second-switching-means-first-contact means and said DC voltage-source-second end and wherein said second-power driver further includes a second diode connected between said second-power-driver-second-switchingmeans-first-contact means and said DC voltage-source-second end.

3. A motor controller as recited in claim 1 wherein said motor further includes a third winding having a first end connected to said first-winding-first end and a second end and wherein said motor controller further comprises a third-power driver including,
- a first-switching means having a control means connected to said commutating-signal-generating means, a first-contact means connected to said capacitor-second end, and a second-contact means connected to said third-winding-second end,
- a first diode connected between said third-power-driver-first-switching-means-first-contact means and said third-power-driver-first-switching-means-second-contact means, and
- a second-switching means having a control means connected to said commutating-signal-generating means, a first-contact means connected to said third-power-driver-first-switching-means-second-contact means, and a second-contact means connected to said first-power-driver-second-switching-means-second-contact means.

4. A motor controller as recited in claim 3 wherein said first-power driver further includes a second diode connected between said first-power-driver-second-switching-means-first-contact means and said DC voltage-source-second end, wherein said second-power driver further includes a second diode connected between said second-power-driver-second-switching-means-first-contact means and said DC voltage-source-second end, and wherein said third-power driver further includes a second diode connected between said third-power-driver-second-switching-means-first-contact means and said DC voltage-source-second end.

5. A motor controller comprising in combination:
a motor including,
- a first winding having a first end and a second end and
- a second winding having a first end connected to said first-winding-first end and a second end;
a DC voltage source having a first end coupled to said first-winding-first end and a second end, said DC voltage source for powering said motor;
a capacitor having a first end connected to said DC voltage-source-second end and a second end;
commutating-signal-generating means;
a first-power driver including,
- a first transistor having a base connected to said commutating-signal-generating means, a collector connected to said capacitor-second end, and an emitter connected to said first-winding-second end,
- a first between said first-power-driver-first-transistor collector and said first-power-driver-first-transistor emitter, and
- a second transistor having a base connected to said commutating-signal-generating means, a collector connected to said first-power-driver-first-transistor emitter, and an emitter;
a second-power driver including,
- a first transistor having a base connected to said commutating-signal-generating means, a collector connected to said capacitor-second end, and an emitter connected to said second-winding-second end,
- a first diode connected between said second-power-driver-first-transistor collector and said second-power-driver-first-transistor emitter, and
- a second transistor having a base connected to said commutating-signal-generating means, a collector connected to said second-power-driver-first-transistor emitter, and an emitter connected to said first-power-driver-second-transistor emitter; and
means coupling said first-power-driver-second-transistor emitter to said DC voltage-source-second end.

6. A motor controller as recited in claim 5 wherein said first-power driver further includes a second diode connected between said first-power-driver-second-transistor collector and said DC voltage-source-second end and wherein said second-power driver further includes a second diode connected between said second-power-driver-second-transistor collector and said DC voltage-source-second end.

7. A motor controller as recited in claim 5 wherein said motor further includes a third winding having a first end connected to said first-winding-first end and a second end and wherein said motor controller further comprises a third-power driver including,
- a first transistor having a base connected to said commutating-signal-generating means, a collector connected to said capacitor-second end, and an emitter connected to said third-winding-second end,
- a first diode connected between said third-power-driver-first-transistor collector and said third-power-driver-first-transistor emitter, and
- a second transistor having a base connected to said commutating-signal-generating means, a collector connected to said third-power-driver-first-transistor emitter, and an emitter connected to said first-power-driver-second-transistor emitter.

8. A motor controller as recited in claim 7 wherein said first-power driver further includes a second diode connected between said first-power-driver-second-transistor collector and said DC voltage-source-second end, wherein said second-power driver further includes a second diode connected between said second-power-driver-second-transistor collector and said DC voltage-source-second end, and wherein said third-power driver further includes a second diode connected between said third-power-driver-second-transistor collector and said DC voltage-source-second end.

9. A motor controller as recited in claim 8 wherein said commutating-signal-generating means includes decoder means having a first, a second, and a third input and wherein said motor further includes a first-Hall-effect device having an output connected to said decoder means first input, a second-Hall-effect device having an output connected to said decoder-means-second input, and a third-Hall-effect device having an output connected to said decoder-means-third input.

10. A motor controller as recited in claim 9 further comprising a resistor having a first end connected to said first-power-driver-second-transistor emitter and a second end connected to said DC voltage-source-second end.

11. A motor controller as recited in claim 10 further comprising a diode connected between sad DC voltage-source-first end and said first-winding-first end.

12. A motor controller comprising in combination:
a motor including, a first winding having a first end and a second end,
a second winding having a first end connected to said first-winding-first and a second end,
a third winding having a first end connected to said first-winding-first end and a second end,
a first-Hall-effect device having an output,
a second-Hall-effect device having an output, and
a third-Hall-effect device having an output;

a DC voltage source having a first end coupled to said first-winding-first end and a second end, said DC voltage source for powering said motor;

a capacitor having a first end connected to said DC voltage-source-second end and a second and; and a UC3602-type-controller device having, a first-power-driver output connected to said first-winding-second end,
a second-power-driver output connected to said second-winding-second end,
a third-power-driver output connected to said third-winding-second end,
a first-decoder input connected to said first-Hall-effect-device output,
a second-decoder input connected to said second-Hall-effect-device output,
a third-decoder input connected to said third-Hall-effect-device output,
a DC power-supply-voltage-source input connected to said capacitor-second end, and
a feedback output coupled to said DC voltage-source-second end.

* * * * *